(12) United States Patent
Huster

(10) Patent No.: US 8,854,654 B2
(45) Date of Patent: Oct. 7, 2014

(54) METHOD AND APPARATUS FOR CONTROLLING ROUTING OF PRINT JOBS

(75) Inventor: Karsten Huster, Bad Iburg (DE)

(73) Assignee: Canon Europa N.V., Amstelveen (NL)

( * ) Notice: Subject to any disclaimer, the term of this patent is extended or adjusted under 35 U.S.C. 154(b) by 1225 days.

(21) Appl. No.: 12/341,937

(22) Filed: Dec. 22, 2008

(65) Prior Publication Data

US 2009/0174895 A1    Jul. 9, 2009

(30) Foreign Application Priority Data

Dec. 28, 2007   (EP) .................................. 07124158

(51) Int. Cl.
| | | |
|---|---|---|
| *G06F 3/12* | (2006.01) | |
| *G06K 15/00* | (2006.01) | |
| *G06F 9/00* | (2006.01) | |

(52) U.S. Cl.
USPC ..................... 358/1.15; 713/176; 358/1.18

(58) Field of Classification Search
CPC . G03G 15/5075; G06F 3/1296; G06G 3/1297
USPC .................................. 713/176; 358/1.15, 1.18
See application file for complete search history.

(56) References Cited

U.S. PATENT DOCUMENTS

| | | |
|---|---|---|
| 5,991,846 A | 11/1999 | Ooki |
| 2002/0071134 A1 | 6/2002 | Jackson et al. |
| 2002/0186407 A1 | 12/2002 | Laughlin |
| 2003/0197885 A1 | 10/2003 | Takeo |
| 2006/0161782 A1* | 7/2006 | Kassan ................... 713/176 |
| 2007/0083679 A1* | 4/2007 | Kikuchi ..................... 710/8 |
| 2008/0180699 A1* | 7/2008 | Selvaraj ................... 358/1.1 |

FOREIGN PATENT DOCUMENTS

EP        1120273 A1     1/2001

* cited by examiner

*Primary Examiner* — Douglas Tran
*Assistant Examiner* — Justin Katzwhite
(74) *Attorney, Agent, or Firm* — Canon U.S.A., Inc. IP Division

(57) ABSTRACT

A computer-implemented method for controlling routing of print jobs, the computer-implemented method includes determining whether a print job meets at least one predetermined criteria and sending a notification based on a result of the determination.

14 Claims, 12 Drawing Sheets

| Printer name | Maximum number of pages | print resolution (dpi) | Colour | cost per page | stapling | Punching |
|---|---|---|---|---|---|---|
| Printer 1 | 10 | 4800 | Yes | € 0.07 | No | No |
| Printer 2 | unlimited | 1200 | No | € 0.01 | Yes | No |
| Printer 3 | 20 | 1200 | Yes | € 0.03 | Yes | Yes |
| ... | ... | ... | ... | ... | ... | ... |

Fig. 5

The print job has too many pages for the selected printer to print. Please select an alternative printer from the list below:

Printer: A    cost per page: € i    status: busy ●
Printer: B    cost per page: € j    status: idle ○
...           ...                   ...

[Cancel]                            [OK]

Fig. 6a

The selected print resolution for this print job is too high for the selected printer to print. Please select an alternative printer from the list below:

Printer: A    cost per page: € i    status: busy ●
Printer: B    cost per page: € j    status: idle ○
...           ...                   ...

[Cancel]                            [OK]

Fig. 6b

The selected printer cannot execute the selected finishing options for this print job. Please select an alternative printer from the list below:

Printer: A    cost per page: € i    status: busy ●
Printer: B    cost per page: € j    status: idle ○
...           ...                   ...

[Cancel]                            [OK]

Fig. 6c

| User | Cost Threshold | Manager |
|---|---|---|
| Bob | € 1 | p.able@company.com |
| Alice | € 1.5 | l.step@company.com |
| .... | .... | .... |
| .... | .... | .... |

"user" has requested authorisation to print a print job with the following details. Please decide whether to allow this print job.

Print job name : ** **
Number of pages: ***
Printer: ********
Cost of job: €***

[Authorized]

[Refused]

Fig. 9

Your print job has been held pending authorization from your manager.

Print job name: ** **

Fig. 10

Your print job has been authorized and has now been sent to the printer.

Print job name: *** **

Fig. 11

Your manager has refused your print job. The print job is stored on the printer server for future reference.

Print job name: ** **

Fig. 12

The print job has too many pages for the selected printer to print. Please select an alternative printer from the list below:

| Printer A | Cost per page: € i,   Cost saving: € j,   Status: Busy<br>Location: IP Dept.   Printer type: Colour copier |
|---|---|
| Printer B | Cost per page: € k,   Cost saving: € l,   Status: Idle<br>Location: Finance Dept.   Printer type: B &W copier |

Fig. 13

METHOD AND APPARATUS FOR CONTROLLING ROUTING OF PRINT JOBS

BACKGROUND OF THE INVENTION

1. Field of the Invention

The present invention relates to a method and apparatus for controlling routing of print jobs.

2. Description of the Related Art

Print services may be provided in many different ways. In offices, for example, printers, such as multifunction peripherals (MFPs), are often provided for access by employees. In order to control printing to an MFP, the MFP is typically connected to a print server. In simple systems, print jobs sent to the MFP are received by the print server, where they are queued and then spooled to the MFP. Increasingly, however, print manager software is being provided on the print server to enhance the functionality. The print manager may allow print jobs to be stored on the server, modified, and/or printed by different printers. In an office this allows an employer to control which printers different employees are able to print to, and the type of printing or finishing that they may perform (such as colour, or black and white printing, stapling).

Another printing environment in which print manager software may be provided is in a print shop or on-line printing service. In these businesses printing is charged for, typically per page, and the print manager records jobs being sent to different printers to provide accounts for billing purposes.

A print manager is provided in the above situations to allow control over how print jobs are processed at the print server. However, in view of the cost of large-scale printing and in order to reduce waste, it is desirable to improve the level of control relating to how jobs are printed. Further, because the decision on how a job should be printed usually rests with a user sending a job for printing, it would be desirable to be able to influence the user's decision-making process in order to prevent careless or unintentional waste of printing resources.

SUMMARY OF THE INVENTION

According to an aspect of the present invention, a computer-implemented method for controlling routing of print jobs includes determining whether a print job meets at least one predetermined criteria and sending a notification based on a result of the determination.

BRIEF DESCRIPTION OF THE DRAWINGS

FIG. 5 shows a printer-lookup table.

FIGS. 6a to 6e show notifications that may be sent to the client.

FIG. 8 shows a limit look-up table of the print manager.

FIG. 9 shows a notification for sending to the manager.

FIG. 10 shows a notification sent to the client when a job is held.

FIG. 11 shows a notification sent to the client when the job is authorized.

FIG. 12 shows a notification sent to the client when the job is refused.

FIG. 13 shows a notification of a second embodiment of the present invention.

DESCRIPTION OF THE EXEMPLARY EMBODIMENTS

Figure 1:
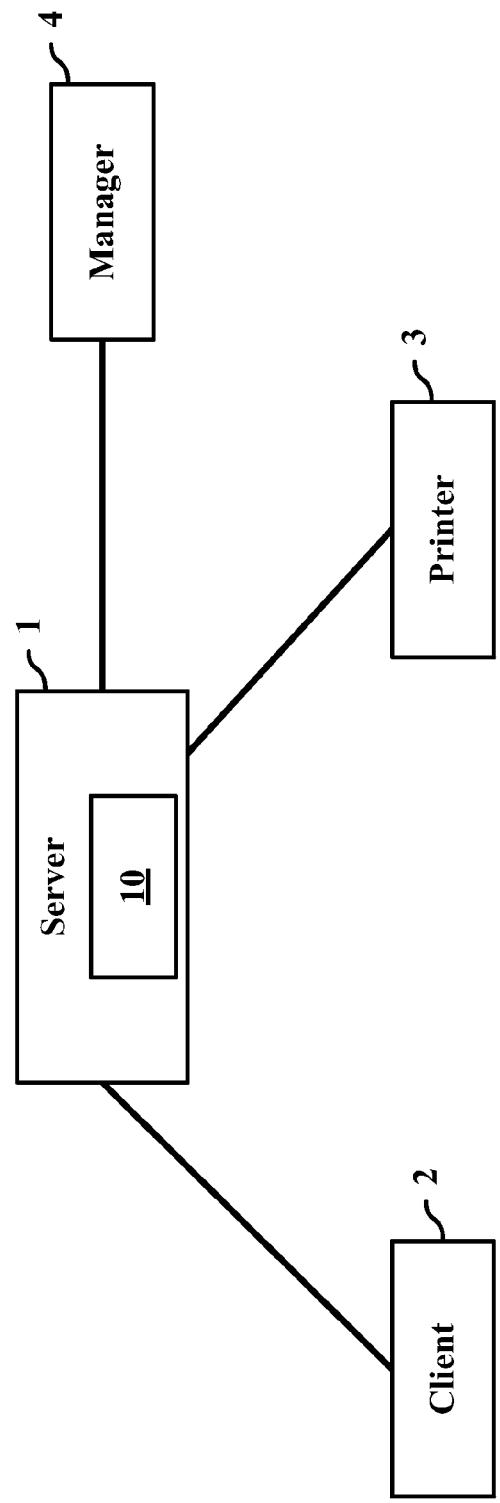
FIG. 1 shows a print management system including a server, manager, client, and printer.

FIG. 1 shows a print management system including a server 1 connected to a client 2, a printer 3, and manager 4 over a LAN. The server 1 is a conventional Windows® based server, the structure of which will be briefly described below. The client 2 is a Windows® based PC. The printer 3 is a conventional printer, such as a printer manufactured by Canon®, HP®, or another printer manufacturer. The manager 4 is a Windows® based PC, similar to the client 2, belonging to an administrator who controls printing of certain jobs on the print management system as will be described below.

Installed on the server 1 is print manager software 10 (hereinafter the print manager) that embodies the present invention.

Figure 2:
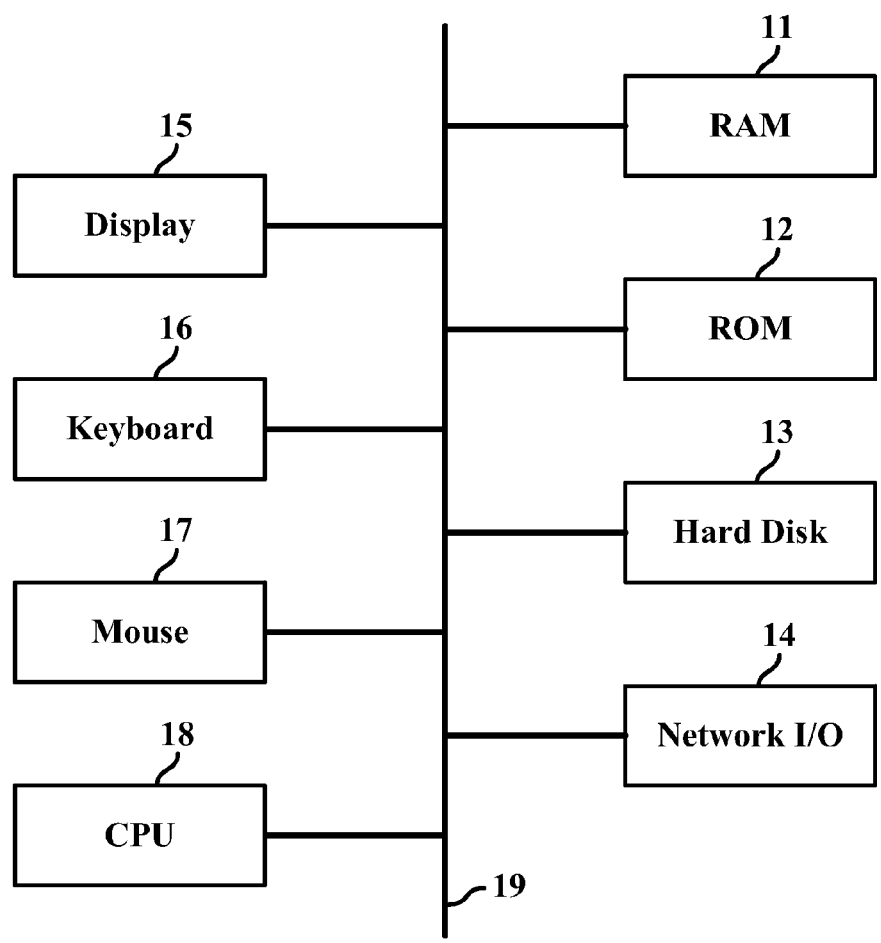
FIG. 2 schematically shows some components of the server.

FIG. 2 is a schematic diagram showing some components of the server 2. The server 2 includes RAM 11, ROM 12, a hard disk 13, a communication module 14, a display 15, a keyboard 16, a mouse 17, and a CPU 18 connected to each other via a bus 19.

The RAM 11 is provided store instructions and to act as a work area for commands being processed by the CPU 18. ROM 12 is provided to store certain software on the server, such as the BIOS. Hard disk 13 is a high capacity storage area provided to store software and data on the server 1. The communication module 14 represents software and hardware provided on the server 1 to allow the server to communicate over the LAN. The display 15 is a TFT display, which, along with the keyboard 16 and mouse 17, provides a user interface to allow a user to control the server.

The CPU 18 is a processor, such as those manufactured by Intel® or AMD®. The CPU processes instructions from programs stored in ROM 12 or Hard disk 13 in order to allow the server to carry out the steps described below in connection with FIGS. 4 to 13.

Installed on the client 2 are a plurality of printer drivers. These printer drivers include a number of conventional printer drivers, which are provided to drive specific printers, and a default printer driver. The default printer driver is a conventional postscript driver except that the driver is not configured for printing to any particular printer on the LAN. Postscript output from the default postscript driver does not identify any particular model of printer for printing to but instead includes a "default" value for the printer identity in the output print attributes.

Figure 3:
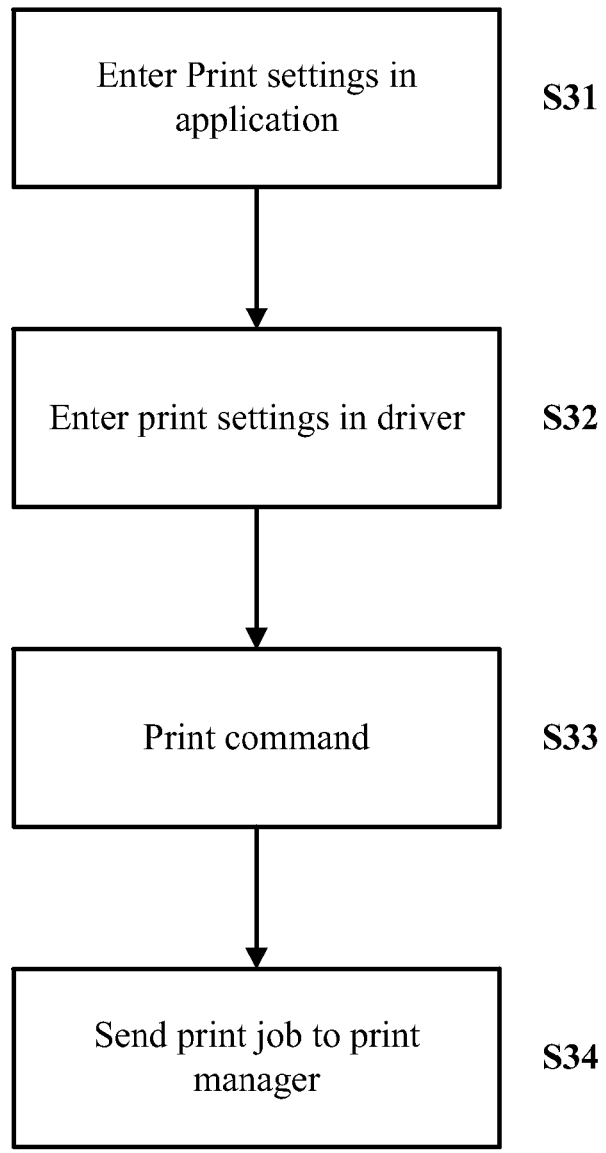
FIG. 3 shows steps performed when printing from the client.

FIG. 3 shows steps performed during printing from the client 2. When a user wants to print using a software application, such as a word processor, on the client 2, he or she selects print settings from within the software application (step S31). These settings will typically identify content from within the application that is to be printed, such as the number of pages of a document to be printed, which sheets from a spreadsheet should be printed, which emails should be printed etc.

In step S32, the user then selects a printer to print to and has an option to enter settings into a printer-driver user interface. The printer-driver user interface allows entry of settings that are generally printer specific and which depend on the capabilities of the printer. The options that may be entered into the printer-driver user interface may include stapling options, binding options, single or double-sided printing, watermarking etc.

If the user has selected one of the conventional printer drivers, the user enters print attributes from attributes available on the selected printer, which attributes are selectable in the printer-driver user interface. If the user has selected the default printer driver, the user may enter print attributes based on options that are not printer specific, but which cover a large number of possible print settings. As will be explained later by selecting to use the default printer driver the print manager 10 is configured to send, after receipt of the print job, a message to the user to allow him or her to select an appropriate printer from a selection of available printers that can print the print job.

Once the user has entered his or her print settings, he or she selects a print command from within the application in step S33. The printer driver then converts the content selected for printing in step S31 and the selected print settings into a print job in a page description language compatible with the selected printer or into postscript in the case of the default printer driver. The print job is then sent to the print manager 10 in step S34.

Figure 4:
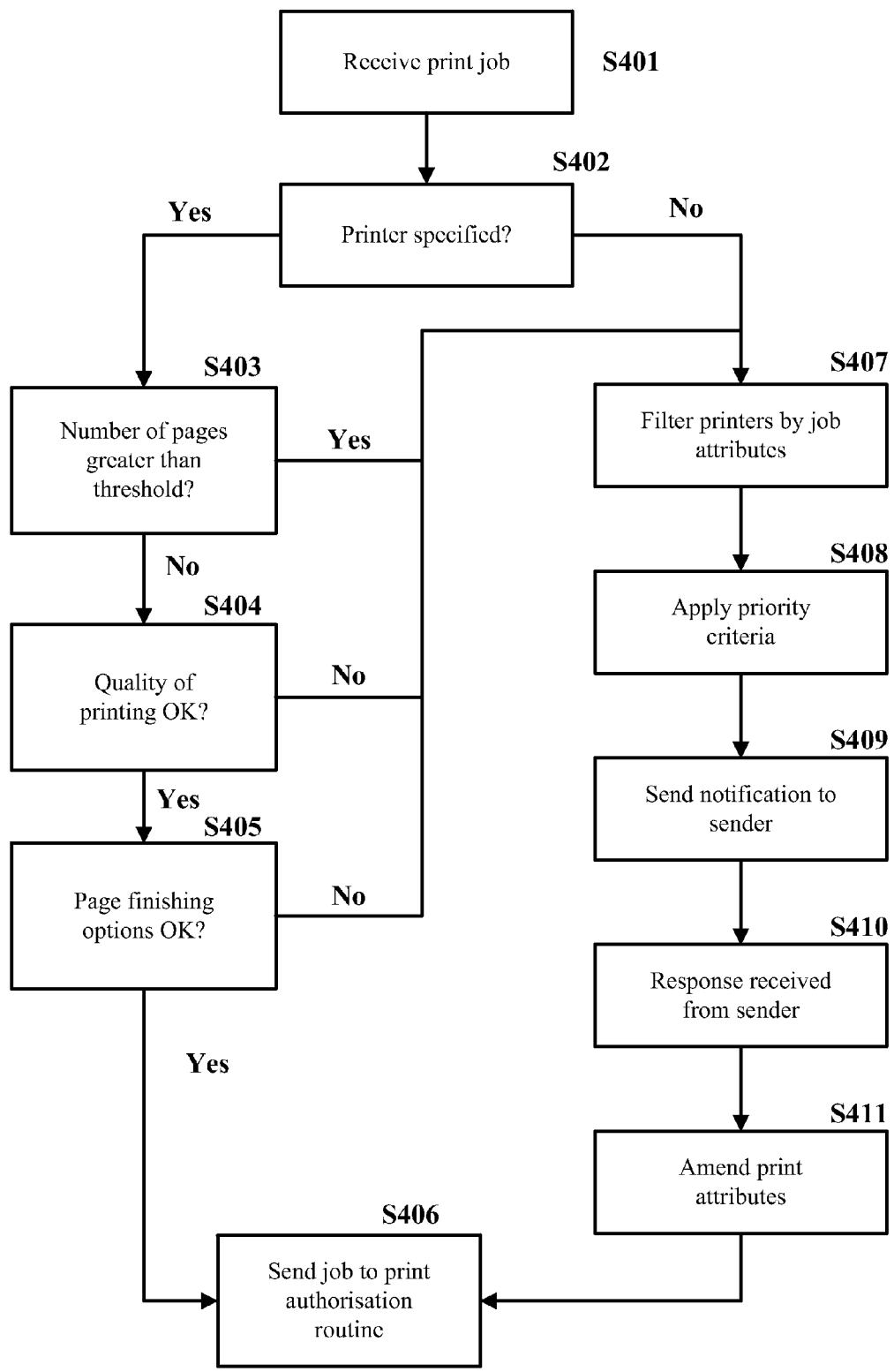
FIG. 4 shows steps performed by a print manager on the server upon receipt of a print job to allow interactive control of a print job.

FIG. 4 shows steps performed by the print manager 10 upon receipt of the print job from the client 2. The print job is received in step S401. In step S402, the print manager 10 analyses the print job to identify whether the print job includes a specified printer. If the print job has been printed from one of the conventional printer drivers, the print manager looks up the printer details in a printer look-up table 5 shown in FIG. 5.

Looking at the entries in FIG. 5, printer 1, shown in the first row of column 50, is an example of an ink-jet photo printer. The printer is relatively slow to print, so the maximum number of pages that may be printed with printer 1 has been set to ten in column 51. Printer 1 has a relatively high printer resolution of 4800 dpi, shown in column 52, and can print in colour (column 53). The cost of printing per page is relatively high at € 0.07 per page (column 54) because the printer 1 uses relatively expensive photographic paper and ink cartridges. As printer 1 is a photo printer, stapling and hole punching options (columns 55 and 56) are not provided on the printer.

Printer 2 is an example of a black and white office copier/printer. This printer is a default printer in this embodiment, so the maximum number of pages that may be printed has been set as unlimited. It is desirable that at least one printer set up on the print management system be set to allow an unlimited number of pages to be printed, because otherwise very long documents may not be printed on the print management system. The print resolution of printer 2 is 1200 dpi and, because printer 2 is a black and white printer, the colour field (column 53) is set to indicate that colour printing is not available. The cost of printing from printer 2 is much lower than that of printer 1 at € 0.01 per page. Printer 2 has a stapler built into it so the stapling field (column 55) is set to yes. Printer 2 does not have a hole punching facility so the punching field (column 56) is set to no.

Printer 3 is an example of a colour office copier. The copier is able to print at around 30 pages per minute, so the maximum number of pages is set higher than printer 1 at twenty pages. This number has been selected to ensure that a user does not have to wait too long for a job to print and bearing in mind the per page cost of copying, which on printer 3 is € 0.03. Printer 3 is provided with both a stapling unit and a punching unit so that both stapling and punching fields are set to yes.

Returning to FIG. 4, once the printer details for the print job have been obtained from the printer look-up table 5, the next step is step S403. In step S403, it is determined whether the print job has a number of pages that is greater than a threshold.

For the purposes of illustration, it is assumed that the printer selected by the user in step S32 was printer 1. In step S403 the print manager examines the print job to determine the number of pages being printed. The determined number of pages is then compared with the maximum number of pages specified in the look-up table 5. If the number of pages being printed is greater than the number of pages specified in the table 5, in this case ten, the step is failed and the method proceeds to step S407. Otherwise, the method proceeds to step S404. In step S404, the print manager 10 determines whether the quality of printing is compatible with the printer. In particular, the print manager 10 examines the print job to determine a requested print resolution of the print job and compares it with the maximum print resolution of printer 1 from the printer look-up table, in this case 4800 dpi.

If the requested print resolution is greater than the maximum print resolution of printer 1, the step S404 is failed and the method proceeds to step S407. If the print job resolution is printable by printer 1, the method proceeds to step S405. In step S405 the print manager determines whether or not finishing options specified in the print job are compatible with the printer specified in the print job. In particular, the print manager 10 examines the print job to determine whether stapling or punching are requested as finishing options. Once the specified finishing options are determined, the print manager 10 compares the specified finishing options with capabilities of the printer listed in the printer look-up table 5. If all the requested print options are available on the printer, the method proceeds to step S406, and the print job is sent to a print authorisation routine, which will be described later in connection with FIG. 7. If the specified printer cannot perform all the requested finishing options the method proceeds to step S407.

In the case that a printer was not specified because the default printer driver was used or the printer selected appears not to be suitable for the print job because one of steps S403 to S405 was failed, the method proceeds to step S407. In step S407, the printers are filtered by job attributes. This process involves examining the print job to determine the number of pages in the print job. The print manager then examines the printers in the printer look-up table 5 and forms a first subset of printers that have a maximum number of pages listed in column 51 that is greater than or equal to the number of pages of the print job. The print manager then examines the print job to determine the requested print resolution of the print job. Once the requested print resolution has been determined, the print manager examines the first subset of printers and creates a second subset of those printers in the first subset that have a print resolution greater than or equal to the requested print resolution. The print manager then examines the print job to determine whether stapling or punching is requested. Once the requested finishing options (stapling or punching) have been determined, the print manager 10 examines the second subset of printer names and creates a third subset of those printers that are able to perform the requested finishing options.

If there are no printers or only one printer in the third subset, the method proceeds to step S409. If there are at least two printers in the third subset, the method proceeds to step S408. In step S408, the printers are sorted into an order and priority based in this example on the cost per page of printing based on data from column 54 of printer look-up table 5.

Thus, printers having lower costs per page are given priority over printers having higher costs per page.

In step S409, a notification is sent to the user. The print job is now held at the server 1 until a response is received from the user. In this embodiment, the notification is provided to the user in the form of a pop-up window including a message. The notification is sent in html and is displayed in a web browser or other application at the client 2. In an alternative embodiment, the notification is sent to the user by email. The content of the notification varies depending on the circumstances.

If the notification is sent as a result of a failure of step S403, and one or more printers have been identified in step S407 that could print the job, a notification of the type shown in FIG. 6a is sent. This notification states that, "The print job has too many pages for the selected printer to print. Please select an alternative printer from the list below". The list of printers, costs per page, and statuses of Printer A and Printer B shown are illustrative. The fields are useful to enable a user to select a specific printer on a cost and availability basis. These fields are filled out with the details of the printers determined in steps S407 and S408. In the case that more than one printer was found in step S407, either a fixed number of printers may be listed, for example the first three printers in the order of priority determined in step S408, or all the printers may be listed. The printers are listed in the order determined in step S408. As can be seen in FIG. 6c, the first printer in the list is provisionally selected and has its radii button "on". The user can select a different printer by actuating its associated radii button.

If the notification is sent as a result of a failure of step S404, and one or more printers have been identified that could print the job, a notification of the type shown in FIG. 6b is sent. The notification states that, "The selected print resolution for this print job is too high for the selected printer to print. Please select an alternative printer from the list below". Again, the list of printers shown in FIG. 6b is illustrative and appropriate printer properties are added as explained in connection with FIG. 6a.

If the notification is sent as a result of a failure of step S405, and one or more printers have been identified that could print the job, a notification of the type shown in FIG. 6c is sent. The notification states that, "The selected printer cannot execute the selected finishing options for this print job. Please select an alternative printer from the list below". Again, the list of printers shown in FIG. 6c is illustrative and appropriate printer properties are added as explained in connection with FIG. 6a.

Figure 6D:
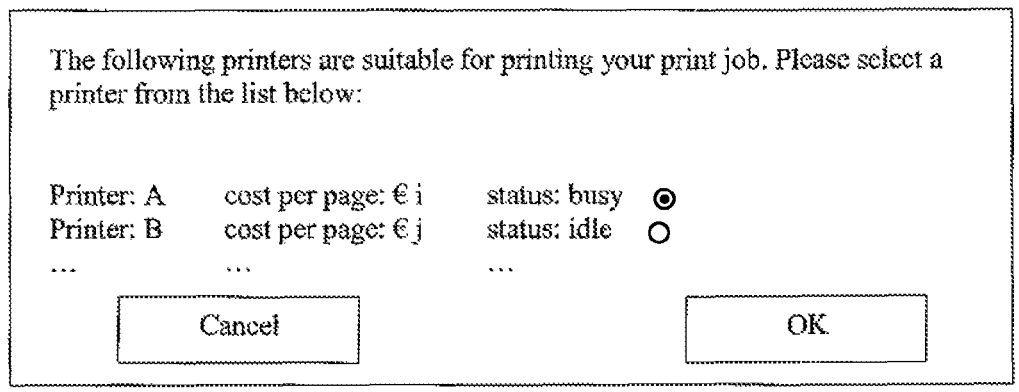

If the notification is sent because no printer was specified in the print job (i.e. the default printer driver was used), the notification shown in FIG. 6d is sent. The notification states that, "The following printers are suitable for printing your print job. Please select a printer from the list below". Again, the list of printers shown is illustrative and appropriate printer properties are added as explained in connection with FIG. 6a.

Figure 6E:
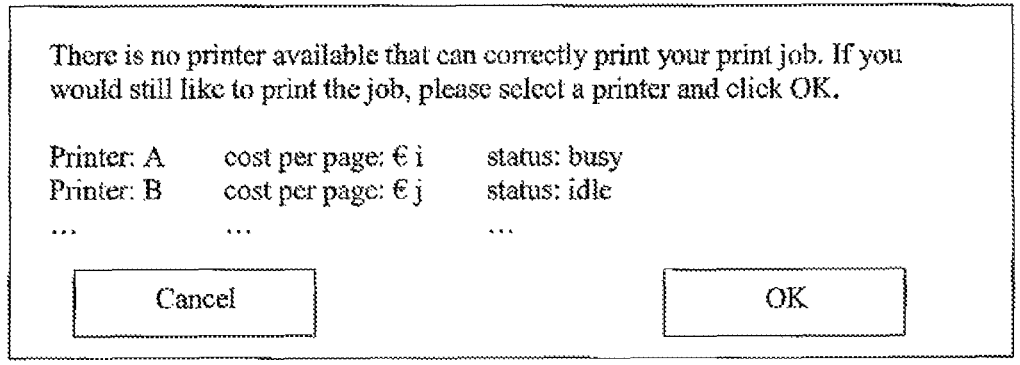

If no printers that can process the job are found in step S407, the notification shown in FIG. 6e is sent. The notification states that, "There is no printer available that can correctly print your print job. If you would still like to print the job, please select a printer and click OK". The list of printers shown below the message in the notification in FIG. 6e includes all the printers from the printer look-up table 5, in the order that they appear in printer look-up table 5.

The print job is then held at the print manager 10 until a response from the user is received.

In step S410, a response from the user is received including a selected printer for printing. This response is sent by the user selecting a printer using one of the radii buttons shown in FIGS. 6a to 6e and clicking OK. In step S411, the print job is examined to determine which printer is currently specified, and if necessary, the print attributes are amended so that the print job reflects the printer selected by the user in his response. If the print job originally specified the default printer driver, the printer attributes are changed to specify the selected printer. If the specified printer in a print job is changed the print manager 10 checks to see which page description language the new printer requires. If necessary, the print job is converted to a different page description language compatible with the specified printer.

In the case that a printer is selected in response to a notification (FIG. 6e) that no printer is available that can print the print job, in step S411 the print manager compares the print attributes of the print job with the printer attributes listed in the printer look-up table. If the number of pages of the print job exceeds the maximum number for the printer listed in column 51, no amendment of this attribute of the print job is necessary and the print job is permitted to proceed with the excessive number of pages. For each other print attribute, if the print job attribute exceeds the relevant capability of the printer, the print job attribute is amended to be within the printer's capabilities.

The print job is then sent to the print authorisation routine in step S406.

Figure 7:
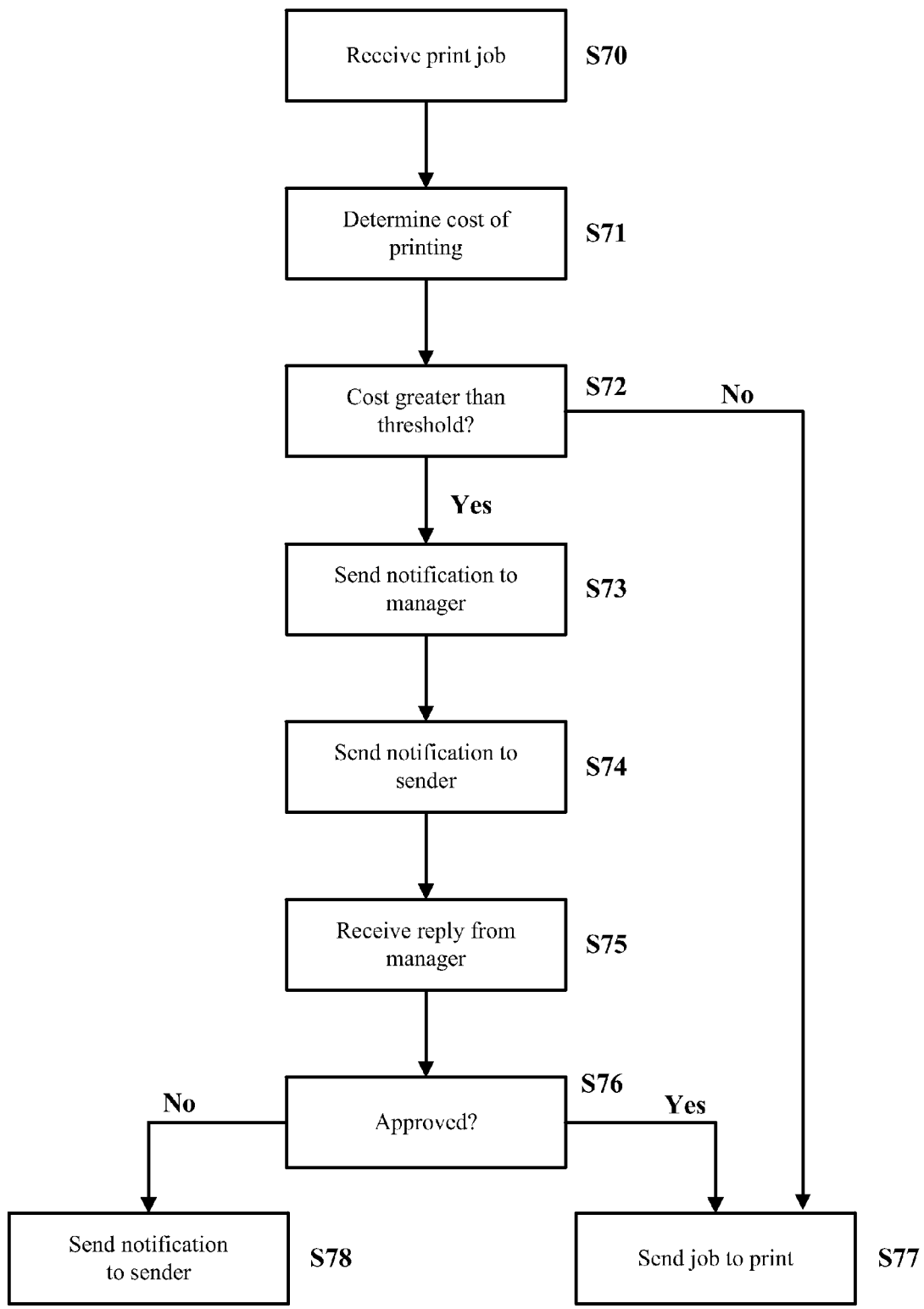
FIG. 7 shows steps performed by the print manager during an authorization routine.

FIG. 7 shows steps performed by the print manager 10 in the print authorisation routine. In step S70, the print job enters the print authorization routine. In step S71, the cost of the print job is determined as follows. The print job is examined to determine the number of pages in the print job and the printer to which the print job is destined. The cost of the print job is then determined by multiplying the number of pages of the print job by the cost per page of the printer, which is obtained from the printer look-up table 5.

In step S72, the print manager 10 determines whether the cost of the print job is greater than a threshold. In order to determine this, the print manager 10 refers to a limit look-up table 8 of the print manager. The limit look-up table 8 of the print manager is shown in FIG. 8.

The limit look-up table 8 includes identities of users of the print management system in column 80, cost thresholds of the users in column 81, and email addresses of managers of the users in column 82. The cost threshold corresponds to the largest cost of a single print job that a user may print without authorisation by a manager. For example, Bob has a cost threshold of €1, above which cost threshold Bob requires authorisation from manager P Able whose email address is p.able@company.com.

If the cost of the print job is determined to be greater than the threshold in step S72, the job is held in an authorization queue on the server 2 and the method proceeds to step S73. Otherwise the method proceeds to step S77 where the job is sent to a print queue for printing according to the print attributes.

In step S73 a notification is sent to and displayed at the manager 3. In this embodiment the notification is displayed in a web browser on the manager PC 3. However, in other embodiments the notification is sent to the manager 3 by email. The email may include a URL, which, when actuated by the manager at the manager PC 3, causes the manager PC 3 to display the authorization queue showing all jobs waiting to be authorized by the manager. An example of such a notification is shown in FIG. 9. The notification 9 states that, "'user' has requested authorization to print a print job with the following details. Please decide whether to allow this print job." The field 'user' is replaced with the name of the sender of the print job received in step S70, e.g. Bob, which may be determined by examining the print job attributes.

In step S74 a notification 10, shown in FIG. 10, is sent to the sender of the job. The notification states that, "Your print job has been held pending authorization from your manager". The print job is then held at the print manager 10 until a response is received from the manager 10.

In step S75, a reply is received from the manager 3 in which either the print job has been authorized or refused. In step S75, the print manager 10 determines from the received reply whether the job has been authorized or refused. If the job has been authorized the method proceeds to step S77. If the job has been refused, the method proceeds to step S78.

In step S77, the print job is sent to a print queue corresponding to the printer specified in the print job. The print job is then queued and spooled to the printer in a conventional manner.

In step S78, the print manager 10 sends a notification 12 to the sender. An example of the notification is shown in FIG. 12. The notification states, "Your manager has refused your print job. The print job is stored on the printer server for future reference". The print job is then stored in a predetermined folder on the printer server for access by the client 2.

In the first embodiment messages sent to the sender to allow the sender to select the printer to be printed were described in connection with FIGS. 6a to 6e. In a second embodiment of the present invention, the information shown in those figures is supplemented as shown in FIG. 13. FIG. 13 corresponds to the notification shown in FIG. 6a. Corresponding modifications are made to the notifications 6b to 6e.

In FIG. 13, the details in connection with printer A include the cost per page of printing from printer A, and a total saving by printing the print job on printer A. The print manager 10 calculates the total saving relative to an original set of print options by multiplying the number of pages in the print job by the cost per page of the printer A to obtain a cost for printer A. The print manager 10 then multiplies the number of pages in the print job by the cost per page of the originally specified printer to obtain an original job cost. The cost saving for printer A is equal to the original job cost minus the cost for printer A. The notification also shows the status of the printer (busy or idle), its location, and a description of the printer type. The details of the location and printer type are stored on the printer manager in a look-up table. The details are entered into the look-up table by an administrator when the print management system is set up.

As described in connection with FIG. 4 above, in the first embodiment, the print manager 10 examines the number of pages in step S403, the quality of printing in step S404, and the page finishing options in step S405 and performs filtering based on similar criteria in step S407. For the avoidance of doubt, it is noted that in other embodiments, the criteria used by the print manager may be different. As will be readily appreciated, in such other embodiments additional criteria may be examined, fewer criteria may be examined, and/or different criteria may be examined depending on the needs of the system.

A further embodiment provides a method for controlling routing of print jobs comprising the steps of determining whether or not a print job meets one or more predetermined criteria, and sending a notification depending upon a result of the determination in the determining step.

The one or more predetermined criteria may include at least one of a number of pages to be printed, quality of printing, and finishing options of the print job.

In some embodiments the step of sending a notification comprises a step of sending a notification to a sender of the print job.

If the print job specifies a printer to print the job, the one or more predetermined criteria may include whether the specified printer is suitable for printing the job. The print job may include at least one specified print attribute, such as quality of printing (dpi), number of pages, colour or black and white printing, finishing settings etc, and the determining step determines whether the printer is suitable for printing the job may comprise a step of comparing such a specified print attribute with a corresponding capability of the selected printer.

The step of sending a notification to the sender of the print job may comprise the step of determining an alternative printer to which the print job could be sent and notifying the sender of the alternative printer. The step of determining an alternative printer may be carried out if a printer originally specified for the print job does not meet said one or more predetermined criteria. In addition or alternatively, the step of determining an alternative printer may be carried out if at least one other printer in addition to a printer originally specified for the print job meets said one or more predetermined criteria. The step of determining the alternative printer may comprise a step of filtering a list of available printers using print attributes of the print job as criteria. In the case that a plurality of printers are available that are able to meet the print attributes of the print job used for filtering, one or more printer may be selected or ordered based on a predetermined printer priority. The predetermined priority may be the cost of printing a page from the printer. The sender may be sent a notification indicating some or all of the printers that are able to meet the print attributes of the print job.

The notification of an alternative printer may include information including at least one of a status of the alternative printer, a capability of the alternative printer, a location of the alternative printer, and an amount of money that may be saved by printing to the alternative printer. The status of the alternative printer may include information such as whether the printer is on-line or off-line and/or a number of jobs waiting to be printed by the alternative printer.

The step of sending a notification may comprise the step of sending a notification to a manager. In such cases, the notification may request approval to print the print job. The method may further comprise the step of holding the print job until approval is received from the manager. The method may comprise the step of sending a notification to a sender of the print job indicating that the print job is being held pending approval by the manager.

The term manager used herein refers to any individual or entity entitled to approve printing of a print job. The role of the manager may be performed by an individual or may be implemented by a computer program and does not necessarily refer to a position or title of the individual or entity within an organisation or company.

The method may further comprise the steps of receiving authorisation from the manager. In such a case, the method may further comprise the step of releasing the print job for printing in the case that the job is authorised. The method may further comprise the step of receiving a refusal from the manager. In such a case, the method may further comprise the step of sending a notification to the sender of the print job that the print job has been refused.

A further embodiment provides an apparatus for controlling routing of print jobs comprising determining means configured to determine whether a print job meets a predetermined criteria and communication means configured to send a notification depending upon a result of the determination carried out by the determining means.

A further embodiment provides a program for controlling routing of print jobs comprising determining means configured to determine whether a print job meets a predetermined criteria and communication means configured to send a notification depending upon a result of the determination carried out by the determining means.

This application claims priority from European patent application no. 07124158.2 filed on 28 Dec. 2007, which is hereby incorporated by reference in its entirety.

What is claimed is:

1. A computer-implemented method for controlling routing of print jobs, the computer-implemented method comprising:
at a default printer driver,
receiving a document and one or more print settings for the document,
generating a print job based on the document and the one or more print settings, and
transferring the print job to a print manager;
at the print manager,
receiving the print job from the default printer driver,
determining whether the print job generated by the default printer driver meets at least one predetermined criterion, wherein the predetermined criterion indicates a setting of an attribute of the print job,
filtering possible printers for printing the print job based on one or more job attributes of the print job generated by the default printer driver and the at least one predetermined criterion, and
sorting the possible printers into an order based on the at least one predetermined criterion; and
displaying the sorted order of possible printers to a user.

2. The computer-implemented method according to claim 1, wherein the at least one predetermined criterion includes at least one of a number of pages to be printed, quality of printing, and finishing options of the print job.

3. The computer-implemented method according to claim 1, further comprising sending a notification is sent to a sender of the print job.

4. The computer-implemented method according to claim 3, wherein the notification includes details of a selected printer.

5. The computer-implemented method according to claim 1, further comprising sending a notification based on a result of the determination, wherein sending the notification includes sending a notification to an entity authorized to approve printing of the print job.

6. The computer-implemented method according to claim 5, wherein the at least one predetermined criterion includes whether a cost of a print job exceeds a predetermined threshold.

7. The computer-implemented method according to claim 5, wherein a threshold is set for each sender of a print job, and wherein the at least one predetermined criterion includes whether a job cost exceeds a predetermined threshold for the particular sender of the print job concerned.

8. The computer-implemented method according to claim 5, wherein the notification includes a request to approve printing the print job.

9. The computer-implemented method according to claim 8, further comprising holding the print job until approval is received from an entity authorized to approve the print job.

10. An apparatus for controlling routing of print jobs, the apparatus comprising:
a default printer driver configured to
receive a document and one or more print settings for the document,
generate a print job based on the document and the one or more print settings, and
transfer the print job to a print manager;
the print manager configured to
receive the print job from the default printer driver after generation of the print job by the default printer driver,
determine whether the print job generated by the default printer driver meets at least one predetermined criterion, wherein the predetermined criterion indicates a setting of an attribute of the print job,
filter possible printers for printing the print job based on one or more job attributes of the print job generated by the default printer driver and the at least one predetermined criterion, and
sort the possible printers into an order based on the at least one predetermined criterion; and
displaying means configured to display the sorted order of possible printers to a user.

11. A non-transitory computer-readable storage medium storing a program to control routing of print jobs that, when run on a processor or computer in an information-processing apparatus, causes the information-processing apparatus to perform operation comprising:
at a default printer driver,
receiving a document and one or more print settings for the document,
generating a print job based on the document and the one or more print settings, and
transferring the print job to a print manager;
at the print manager,
receiving the print job from the default printer driver,
determining whether the print job generated by the default printer driver meets at least one predetermined criterion, wherein the predetermined criterion indicates a setting of an attribute of the print job;
filtering possible printers for printing the print job based on one or more job attributes of the print job generated by the default printer driver and the at least one predetermined criterion, and
sorting the possible printer into an order based on the at least one predetermined criterion; and
displaying the sorted order of possible printers to a user.

12. The computer-implemented method according to claim 1, wherein the job attributes of the print job are changed to specify a printer selected by the user.

13. The computer-implemented method according to claim 1, further comprising receiving, after generation of the print job by the default printer driver, a selection of a printer to print the print job that indicates one of the possible printers.

14. The computer-implemented method according to claim 1, wherein the one or more job attributes of the print job are one or more print settings of the print job.

* * * * *